(12) United States Patent
Peng

(10) Patent No.: US 11,816,714 B2
(45) Date of Patent: Nov. 14, 2023

(54) SERVICE VERIFICATION METHOD AND APPARATUS

(71) Applicant: ADVANCED NEW TECHNOLOGIES CO., LTD., Grand Cayman (KY)

(72) Inventor: Jian Peng, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 652 days.

(21) Appl. No.: 16/959,911

(22) PCT Filed: Jan. 29, 2019

(86) PCT No.: PCT/CN2019/073555
§ 371 (c)(1),
(2) Date: Jul. 2, 2020

(87) PCT Pub. No.: WO2019/179244
PCT Pub. Date: Sep. 26, 2019

(65) Prior Publication Data
US 2021/0082014 A1 Mar. 18, 2021

(30) Foreign Application Priority Data
Mar. 19, 2018 (CN) .......................... 201810224144.3

(51) Int. Cl.
*H04L 67/2895* (2022.01)
*G06Q 30/0601* (2023.01)
(Continued)

(52) U.S. Cl.
CPC ..... *G06Q 30/0609* (2013.01); *H04L 67/2895* (2013.01); *H04L 67/306* (2013.01); *H04L 67/568* (2022.05); *G06Q 30/0633* (2013.01)

(58) Field of Classification Search
CPC . H04L 67/2895; H04L 67/306; H04L 67/568; G06Q 30/0633
See application file for complete search history.

(56) References Cited

U.S. PATENT DOCUMENTS

| 4,281,391 A | 7/1981 | Huang |
| 6,526,166 B1 | 2/2003 | Gorman |
| (Continued) | | |

FOREIGN PATENT DOCUMENTS

| CN | 101383032 | 3/2009 |
| CN | 201498035 | 6/2010 |
| (Continued) | | |

*Primary Examiner* — Philip C Lee
(74) *Attorney, Agent, or Firm* — Seed IP Law Group LLP

(57) ABSTRACT

Embodiments of the present disclosure provide a service-verification method and apparatus, wherein the method comprises: respectively receiving service parameters sent by a same user account on different terminals, respectively calculating corresponding service data according to the service parameters sent by each terminal; storing a plurality of corresponding relationships, each corresponding relationship comprising: service parameters sent by one terminal and corresponding calculated service data; when a service-processing request sent by any one of the different terminals is received and the service-processing request carries a target service parameter and target service data used in a current service, obtaining service data corresponding to the target service parameter according to the corresponding relationships; and acquiring a verification result according to a comparison between the obtained service data and the target service data.

15 Claims, 3 Drawing Sheets

(51) Int. Cl.
  *H04L 67/568* (2022.01)
  *H04L 67/306* (2022.01)

(56) References Cited

U.S. PATENT DOCUMENTS

| | | |
|---|---|---|
| 6,601,035 B1 | 7/2003 | Panagos |
| 6,697,947 B1 | 2/2004 | Matyas, Jr. |
| 6,725,448 B1 | 4/2004 | Moriya |
| 6,726,094 B1 | 4/2004 | Rantze |
| 7,103,577 B2 | 9/2006 | Blair |
| 7,130,817 B2 | 10/2006 | Karas |
| 7,149,720 B2 | 12/2006 | Shepherd |
| 7,321,874 B2 | 1/2008 | Dilip |
| 7,447,663 B1 | 11/2008 | Barker |
| 7,617,157 B2 | 11/2009 | Seifert |
| 7,636,679 B2 | 12/2009 | Song |
| 7,734,527 B2 | 6/2010 | Uzo |
| 7,809,636 B1 | 10/2010 | Jou |
| 7,809,762 B1 | 10/2010 | Parker |
| 7,877,297 B2 | 1/2011 | Gould |
| 7,941,760 B2 | 5/2011 | Kocienda |
| 7,946,474 B1 | 5/2011 | Agrawal |
| 7,978,900 B2 | 7/2011 | Nepomniachtchi |
| 8,090,642 B1 | 1/2012 | Van Doren |
| 8,176,324 B1 | 5/2012 | Krishnamurthy |
| 8,280,782 B1 | 10/2012 | Talreja |
| 8,423,392 B2 | 4/2013 | Moxley |
| 8,423,467 B1 | 4/2013 | Johansson |
| 8,498,933 B1 | 7/2013 | Bent |
| 8,645,295 B1 | 2/2014 | Dillard |
| 9,111,073 B1 | 8/2015 | Jiang |
| 9,239,722 B1 | 1/2016 | Calahan |
| 9,317,850 B2 | 4/2016 | Keresman, III |
| 9,621,348 B2 | 4/2017 | Bahjat |
| 9,715,681 B2 | 7/2017 | Hammad |
| 10,176,478 B2 | 1/2019 | Griggs |
| 10,586,227 B2 | 3/2020 | Makhdumi |
| 2002/0111916 A1 | 8/2002 | Coronna |
| 2002/0156687 A1 | 10/2002 | Carr |
| 2002/0161466 A1 | 10/2002 | Heching |
| 2003/0042301 A1 | 3/2003 | Rajasekaran |
| 2003/0061172 A1 | 3/2003 | Robinson |
| 2003/0200190 A1 | 10/2003 | Adar |
| 2004/0139008 A1 | 7/2004 | Mascavage |
| 2004/0153407 A1 | 8/2004 | Clubb |
| 2005/0038707 A1 | 2/2005 | Roever |
| 2005/0071637 A1 | 3/2005 | Shirakawa |
| 2005/0075954 A1 | 4/2005 | Matsumoto |
| 2005/0113123 A1 | 5/2005 | Torvinen |
| 2005/0144406 A1 | 6/2005 | Chong |
| 2005/0170856 A1 | 8/2005 | Keyani |
| 2005/0240935 A1 | 10/2005 | Ramanathan |
| 2006/0010190 A1 | 1/2006 | Shimbo |
| 2006/0056626 A1 | 3/2006 | Keohane |
| 2006/0069635 A1 | 3/2006 | Ram |
| 2006/0089897 A1 | 4/2006 | Maas |
| 2006/0176847 A1 | 8/2006 | Chen |
| 2006/0220842 A1 | 10/2006 | Breed |
| 2006/0271783 A1 | 11/2006 | Wong |
| 2007/0035617 A1 | 2/2007 | Ko |
| 2007/0043651 A1 | 2/2007 | Xiao |
| 2007/0276730 A1 | 11/2007 | Lee |
| 2008/0004981 A1 | 1/2008 | Gopalpur |
| 2008/0077542 A1 | 3/2008 | Mcelhiney |
| 2008/0097805 A1 | 4/2008 | Wells |
| 2008/0119160 A1 | 5/2008 | Andriantsiferana |
| 2008/0120160 A1 | 5/2008 | Woo |
| 2008/0182586 A1 | 7/2008 | Aaron |
| 2008/0228595 A1 | 9/2008 | Hill |
| 2008/0235122 A1 | 9/2008 | Weitzman |
| 2008/0306839 A1 | 12/2008 | Starrs |
| 2009/0076926 A1 | 3/2009 | Zinberg |
| 2009/0090772 A1 | 4/2009 | Lee |
| 2009/0094275 A1 | 4/2009 | Patton |
| 2009/0106825 A1 | 4/2009 | Cerruti |
| 2009/0144451 A1 | 6/2009 | Cabezas |
| 2009/0157522 A1 | 6/2009 | Srinivasan |
| 2009/0195506 A1 | 8/2009 | Geidl |
| 2010/0042600 A1 | 2/2010 | Orr |
| 2010/0060585 A1 | 3/2010 | Chiu |
| 2010/0073302 A1 | 3/2010 | Ritzau |
| 2010/0088026 A1 | 4/2010 | Manolescu |
| 2010/0162036 A1 | 6/2010 | Linden |
| 2010/0191648 A1 | 7/2010 | Smith |
| 2010/0210240 A1 | 8/2010 | Mahaffey |
| 2010/0223543 A1 | 9/2010 | Marston |
| 2010/0235283 A1 | 9/2010 | Gerson |
| 2010/0241575 A1 | 9/2010 | Cotton |
| 2010/0250436 A1 | 9/2010 | Loevenguth |
| 2011/0016520 A1 | 1/2011 | Cohen |
| 2011/0093493 A1 | 4/2011 | Nair |
| 2011/0125616 A1 | 5/2011 | Ni |
| 2011/0125667 A1 | 5/2011 | Faludi |
| 2011/0184840 A1 | 7/2011 | Godard |
| 2011/0231465 A1 | 9/2011 | Phatak |
| 2011/0258027 A1 | 10/2011 | Lee |
| 2011/0264598 A1 | 10/2011 | Fuxman |
| 2011/0269425 A1* | 11/2011 | Drovdahl ............ H04L 63/0838 |
| | | 455/411 |
| 2012/0016799 A1 | 1/2012 | Killian |
| 2012/0076283 A1 | 3/2012 | Ajmera |
| 2012/0101942 A1 | 4/2012 | Park |
| 2012/0116869 A1 | 5/2012 | Vasudevan et al. |
| 2012/0117271 A1 | 5/2012 | Kennedy |
| 2012/0143924 A1 | 6/2012 | Sethi |
| 2012/0158467 A1 | 6/2012 | Hammad |
| 2012/0198228 A1 | 8/2012 | Oberheide |
| 2012/0204256 A1 | 8/2012 | Craine |
| 2012/0233073 A1 | 9/2012 | Salmon |
| 2012/0259774 A1 | 10/2012 | Marti |
| 2012/0259783 A1 | 10/2012 | Kemper |
| 2012/0284776 A1 | 11/2012 | Sundaram |
| 2012/0299831 A1 | 11/2012 | Lioy |
| 2012/0323846 A1 | 12/2012 | Bai |
| 2013/0066889 A1 | 3/2013 | Rodriguez |
| 2013/0067055 A1 | 3/2013 | Cheng |
| 2013/0094751 A1 | 4/2013 | Nepomniachtchi |
| 2013/0110670 A1 | 5/2013 | Webber |
| 2013/0232071 A1 | 9/2013 | Dilip |
| 2013/0246172 A1 | 9/2013 | Moissinac |
| 2013/0311532 A1 | 11/2013 | Olsen |
| 2013/0317895 A1 | 11/2013 | Turner |
| 2013/0331130 A1 | 12/2013 | Lee |
| 2014/0037184 A1 | 2/2014 | Gorski |
| 2014/0052636 A1 | 2/2014 | Mattes |
| 2014/0156512 A1 | 6/2014 | Rahman |
| 2014/0162698 A1 | 6/2014 | Han |
| 2014/0164109 A1 | 6/2014 | Chow |
| 2014/0173755 A1 | 6/2014 | Wahl |
| 2014/0236801 A1 | 8/2014 | Hansen |
| 2014/0279525 A1 | 9/2014 | Mohsenzadeh |
| 2014/0280910 A1 | 9/2014 | Swig |
| 2014/0306896 A1 | 10/2014 | Sosby |
| 2014/0310133 A1 | 10/2014 | Bednar |
| 2014/0310171 A1 | 10/2014 | Grossman |
| 2015/0066679 A1 | 3/2015 | Mack |
| 2015/0154587 A1 | 6/2015 | Chetty |
| 2015/0186989 A1 | 7/2015 | Kneen |
| 2015/0220876 A1 | 8/2015 | Sethi |
| 2015/0235477 A1 | 8/2015 | Simkin |
| 2015/0356288 A1 | 12/2015 | Guo |
| 2015/0379460 A1 | 12/2015 | Zamer |
| 2015/0381629 A1 | 12/2015 | O'Sullivan |
| 2016/0004857 A1 | 1/2016 | Chen |
| 2016/0012503 A1 | 1/2016 | Fu |
| 2016/0077734 A1 | 3/2016 | Buxton |
| 2017/0270598 A1 | 9/2017 | Ram |
| 2019/0230070 A1* | 7/2019 | Isaacson ............ H04W 12/084 |

FOREIGN PATENT DOCUMENTS

| | | |
|---|---|---|
| CN | 103559190 A | 2/2014 |
| CN | 106888248 A | 6/2017 |
| CN | 107786491 A | 3/2018 |

(56) References Cited

FOREIGN PATENT DOCUMENTS

| | | | |
|---|---|---|---|
| CN | 108632348 A | 10/2018 | |
| DE | 102004047258 | 4/2006 | |
| EP | 0992949 | 4/2000 | |
| EP | 1067471 | 1/2001 | |
| GB | 2378787 | 2/2003 | |
| JP | 10240690 | 9/1998 | |
| JP | 2000082101 | 3/2000 | |
| JP | 2001297283 | 10/2001 | |
| JP | 2003271851 | 9/2003 | |
| JP | 2006259854 | 9/2006 | |
| JP | 2007087081 | 4/2007 | |
| JP | 2008532112 | 8/2008 | |
| JP | 2009020676 | 1/2009 | |
| JP | 2010066886 | 3/2010 | |
| JP | 2012168616 | 9/2012 | |
| JP | 2013235605 | 11/2013 | |
| JP | 201441614 | 6/2014 | |
| JP | 2014515149 | 6/2014 | |
| JP | 6564841 B2 * | 8/2019 | ............ G06F 13/00 |
| KR | 20020057906 | 7/2002 | |
| KR | 1020020057906 | 7/2002 | |
| KR | 1020070034296 | 3/2007 | |
| WO | 2012045128 | 4/2012 | |
| WO | 2013003372 | 1/2013 | |
| WO | 2013149883 | 10/2013 | |
| WO | WO-2016201267 A1 * | 12/2016 | ............ G06Q 20/00 |
| WO | 2017080768 | 5/2017 | |

* cited by examiner

SERVICE VERIFICATION METHOD AND APPARATUS

FIELD

The present application relates to the field of computer technologies, in particular to a service-verification method and apparatus.

BACKGROUND

Some services may involve the calculation of dynamic data. For example, a user can use his wireless terminal to shop online and select shopping parameters (e.g., the delivery address) on the shopping page. The backend server of the shopping application can calculate corresponding service data (e.g., shipping cost corresponding to the delivery address) according to the parameter selected by the user, and display the service data on the terminal page for user confirmation. After user confirmation, the data can be used to execute service logic processing. In this case, the above service data is calculated based on the parameters selected by the user on the page. When the parameters selected by the user change, the corresponding service data also changes. This type of service data may be referred to as dynamic data.

In order to ensure service security, the dynamic data usually needs to be verified. For example, the backend server can store the service data in the cache after sending the calculated service data to the terminal page for display to the user. After the user confirms and submits the service data, it is checked whether the service data transmitted from the user terminal is the same as the above cached service data. If the two pieces of data are the same, the verification succeeds and the subsequent service processing is performed using the service data. If the two pieces of data are different, then the verification fails and the service procedure terminates.

SUMMARY

Accordingly, the present disclosure provides a service-verification method and apparatus to improve service security.

In particular, one or a plurality of embodiments of the present disclosure are implemented using the following technical solutions.

In a first aspect, a service-verification method is provided, the method comprising:
  respectively receiving service parameters sent by the same user account on different terminals, the service parameters sent by the different terminals being different;
  respectively calculating corresponding service data according to the service parameter sent by each terminal;
  storing a plurality of corresponding relationships, each corresponding relationship comprising: the service parameter sent by one terminal and the corresponding calculated service data;
  when a service-processing request sent by any one of the different terminals is received and the service-processing request carries a target service parameter and target service data used in a current service, obtaining service data corresponding to the target service parameter according to the corresponding relationship; and
  acquiring a verification result according to a comparison between the obtained service data and the target service data.

In a second aspect, a service-verification apparatus is provided, the apparatus comprising:
  a parameter-receiving module configured to respectively receive service parameters sent by the same user account on different terminals, the service parameters sent by the different terminals being different;
  a data-calculation module configured to respectively calculate corresponding service data according to the service parameter sent by each terminal;
  a relationship-storage module configured to store a plurality of corresponding relationships, each corresponding relationship comprising: the service parameter sent by one terminal and the corresponding calculated service data;
  a data-obtaining module configured to: when a service-processing request sent by any one of the different terminals is received and the service-processing request carries a target service parameter and target service data used in a current service, obtaining service data corresponding to the target service parameter according to the corresponding relationship; and
  a comparison-verification module configured to acquiring a verification result according to a comparison between the obtained service data and the target service data.

In a third aspect, a service-verification device is provided, the device comprising: a memory, a processor, and computer instructions stored on the memory and executable on the processor, when executing the instructions, the processor implementing the following operations:
  respectively receiving service parameters sent by the same user account on different terminals, the service parameters sent by the different terminals being different;
  respectively calculating corresponding service data according to the service parameter sent by each terminal;
  storing a plurality of corresponding relationships, each corresponding relationship comprising: the service parameter sent by one terminal and the corresponding calculated service data;
  when a service-processing request sent by any one of the different terminals is received and the service-processing request carries a target service parameter and target service data used in a current service, obtaining service data corresponding to the target service parameter according to the corresponding relationship; and
  acquiring a verification result according to a comparison between the obtained service data and the target service data.

By storing the service parameter sent by each terminal of the same account and the corresponding calculated service data in the cache, the service-verification method and apparatus of one or more embodiments of the present disclosure can ensure that verification logic of individual terminals do not interfere with each other, thereby ensuring better service flow.

BRIEF DESCRIPTION OF THE FIGURES

In order to more clearly explain the technical solutions in one or more embodiments of the present disclosure or in current technologies, the drawings required in the description of the disclosed embodiments or the current technologies are briefly introduced below. It is obvious that the drawings described below are merely some of embodiments of the disclosed one or a plurality of embodiments. Those of ordinary skill in the art can also obtain other drawings based on these drawings, without inventive efforts.

DETAILED DESCRIPTION

In order for those skilled in the art to better understand the technical solutions in the one or more embodiments of the present disclosure, the technical solutions in the one or more embodiments of the present application are clearly and completely described below with reference to the drawings. It is obvious that the described embodiments are merely a part of the embodiments and not all of the embodiments. Based on the one or more embodiments of the present application, all other embodiments obtained by those of ordinary skill in the art without creative efforts shall fall within the protection scope of the present disclosure.

In an application scenario involving computation of dynamic data, it is possible that data submitted by a user can be tampered with. For example, when the same user account is used to operate on multiple terminals to obtain dynamic data, a service exception may occur.

For example, a user A selects, on his own wireless terminal a, a service parameter P1 on a page of a shopping application, and a backend server accordingly calculates corresponding service data D1 and stores it in the session. D1 can be displayed and stored on wireless terminal a for confirmation by user A. A user B uses, on another wireless terminal b, the same account as that of the user A to open the same page, but selects another service parameter P2. Accordingly, the backend server calculates another piece of service data D2, which is also stored in the session and overwrites D1. User A finally submits a service-processing request on the wireless terminal a, the service-processing request carrying service parameter P1 selected on wireless terminal a and the confirmed D1.

The above situation is a case of data tampering. User A originally selects the service parameter P1, but the user B tampers with the parameter, changing it into the service parameter P2 on another wireless terminal. Such tampering may be malicious or unintentional. Using a case where the tampering is actually caused by the user unintentionally as an example, user B is a relative or friend of user A and uses the account of user A to change the service parameter on another wireless terminal, but user A is unaware of this change. When user A submits a service-processing request on his own wireless terminal a, verification logic of the backend server compares D1 transmitted by the terminal with the service data stored in the session, and only considers the verification being successful when the two pieces of data are the same. As mentioned above, data stored in the session is replaced as D2, and D1 and D2 are different, the server then determines that the verification fails, notifies user A of a system exception, and interrupts the service processing. This can lead to the service of user A not able to be carried out normally.

Figure 1:
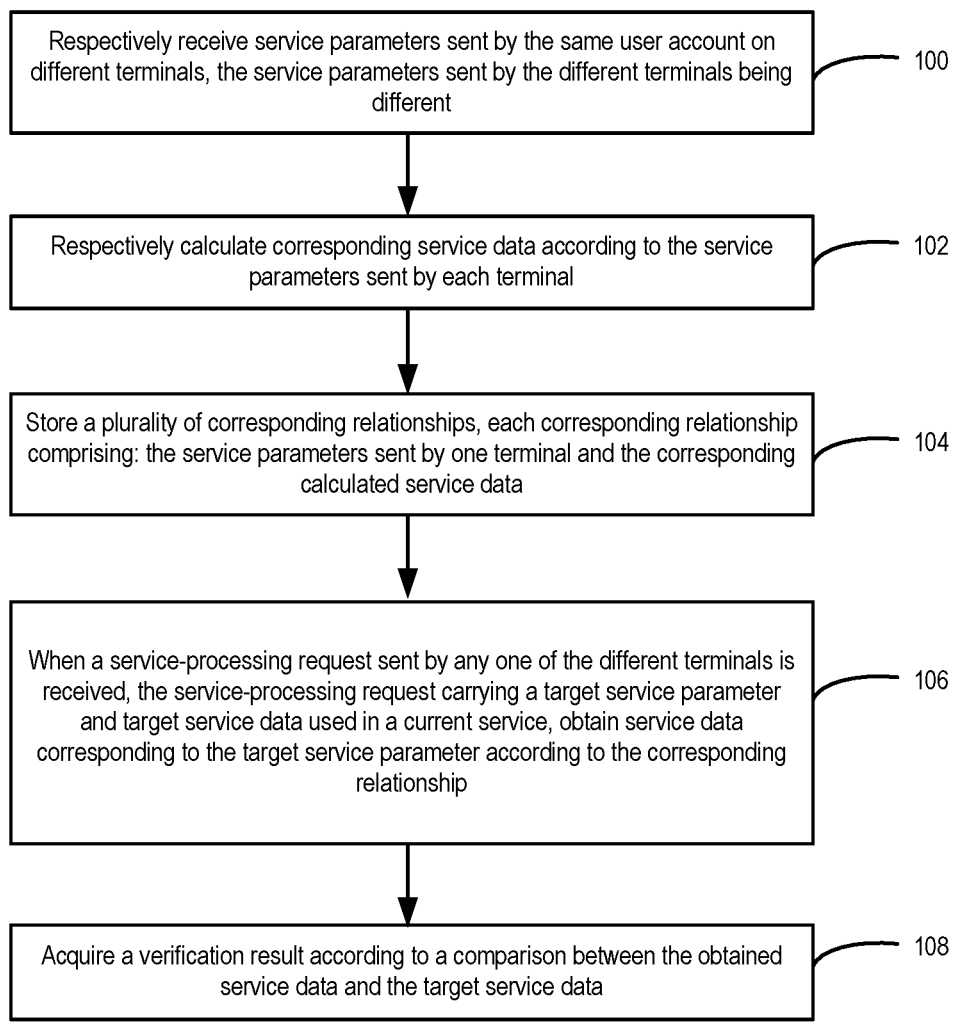
FIG. 1 is a flowchart of a service verification method provided by one or more embodiments of the present disclosure.

That is, when the same account is operated on different terminals and calculation of dynamic data is performed on each terminal, service data from different terminals may overwrite one another in the session, resulting in mutual interference in the service verification on the different terminals and affecting service flow. In view of this, one or more embodiments of the present disclosure provide a service-verification method as shown in FIG. 1 to solve the above problem. The method shown in FIG. 1 may be executed by a backend server.

In operation 100, service parameters sent by the same user account on different terminals are respectively received, and the service parameters sent from the different terminals are different.

For example, the same user account sending service parameters on different terminals may be the same user using his same account to operate on different terminals, or different users using the same account to operate on different terminals. The service parameters sent from different terminals may be different. For example, the parameter sent by one terminal is P1, and the parameter sent by another terminal is P2.

In one example, the user account may be an account of an application, and different users can register respective accounts thereof on the application. For example, a user can register an account of a shopping application, and shop on the shopping application using the account. Service parameters sent by different terminals can all be sent to a backend server corresponding to the above-mentioned application. For example, the user logs into his account of the shopping application on a particular terminal, selects a service parameter, and sends the service parameter to the backend server of the shopping application.

In operation 102, corresponding service data is respectively calculated according to the service parameter sent by each terminal.

In this operation, the backend server can respectively calculate the corresponding service data according to the service parameter of each terminal. One terminal may send one or more service parameters, and the backend server may comprehensively calculate the corresponding service data according to the one or more service parameters. The manner of calculation can be determined according to service characteristics.

For example, a service parameter sent by one terminal can be one parameter p1, and then the server can calculate corresponding D11 according to p1; service parameters sent by another terminal can be two parameters p2 and p3, and the server can then calculate corresponding D12 according to p2 and p3.

In operation 104, a plurality of corresponding relationships are stored, and each corresponding relationship includes the service parameter sent by one terminal and the service data obtaining via a corresponding calculation.

The corresponding relationship in this operation can be used to indicate a corresponding relationship between the service parameter sent by one terminal and the service data calculated according to the service parameter. The service parameter and service data in the corresponding relationship are obtained before the backend server sends the service data to a page to display to the user for confirmation. For example, if the user selects service parameters p2 and p3 on the terminal page, the backend server can calculate and acquire D12 according to these two parameters, and then send D12 to the terminal page to display for user confirmation. The server then stores a corresponding relationship between the above "p2 and p3" and "D12." Certainly, the corresponding relationship described herein may be an identifier calculated according to "p2 and p3."

In operation 106, when a service-processing request sent by any one of the different terminals is received and the service-processing request carries a target service parameter and target service data used in a current service, service data corresponding to the target service parameter is obtained according to the corresponding relationship.

Since the backend server stores the corresponding relationship between the service parameter sent by each terminal and the service data, for a service-processing request sent by any terminal, service data corresponding to the service parameter in the request can be found according to the corresponding relationship. The service-processing request in this operation may be submitted after the user confirms the service data displayed on the terminal page. The service parameter and service data carried in the request may be respectively referred to as target service parameter and target service data.

In operation 108, a verification result is acquired according to a comparison between the obtained service data and the target service data.

In this example, a comparison can be made to determine whether the service data obtained in operation 106 and the target service data are the same. If they are same, it is considered that the verification is successful, a service corresponding to the service-processing request is executed using the target service data, and the target service data is saved to a database. According to this method, even if there are multiple terminals operated by the same account, regardless of which terminal is submitting the service-processing request, it is only needed to check whether a service parameter sent by the terminal that submits the request matches the service data (a matching means that the service data can be calculated according to the service parameter). In addition, the server stores the corresponding relationship between the service parameter and the service data, and the service data in this corresponding relationship is calculated by the server itself and can be guaranteed to be truthful and accurate. An accurate determination as to whether the service parameter in the service-processing request matches the service data can be made according to the corresponding relationship.

Otherwise, if the service data is different from the target service data, then it can be determined that the verification fails and the service-processing request is rejected. In this case, the verification failure may result from, for example, the user accidentally or intentionally modifying the service parameter, resulting in the service data acquired by the server according to the modified service parameter being different from the target service data. At this time, the server does not allow the user to perform subsequent operations, and an exception notification is provided.

In the above service verification method, the corresponding relationships between service parameters and service data of different terminals are stored, such that, even if a same account is sending a service parameter on different terminals, data in the session will not be overwritten. Therefore, service verification of each terminal can be respectively and independently performed, thereby preventing interference between different terminal operations.

Figure 2:
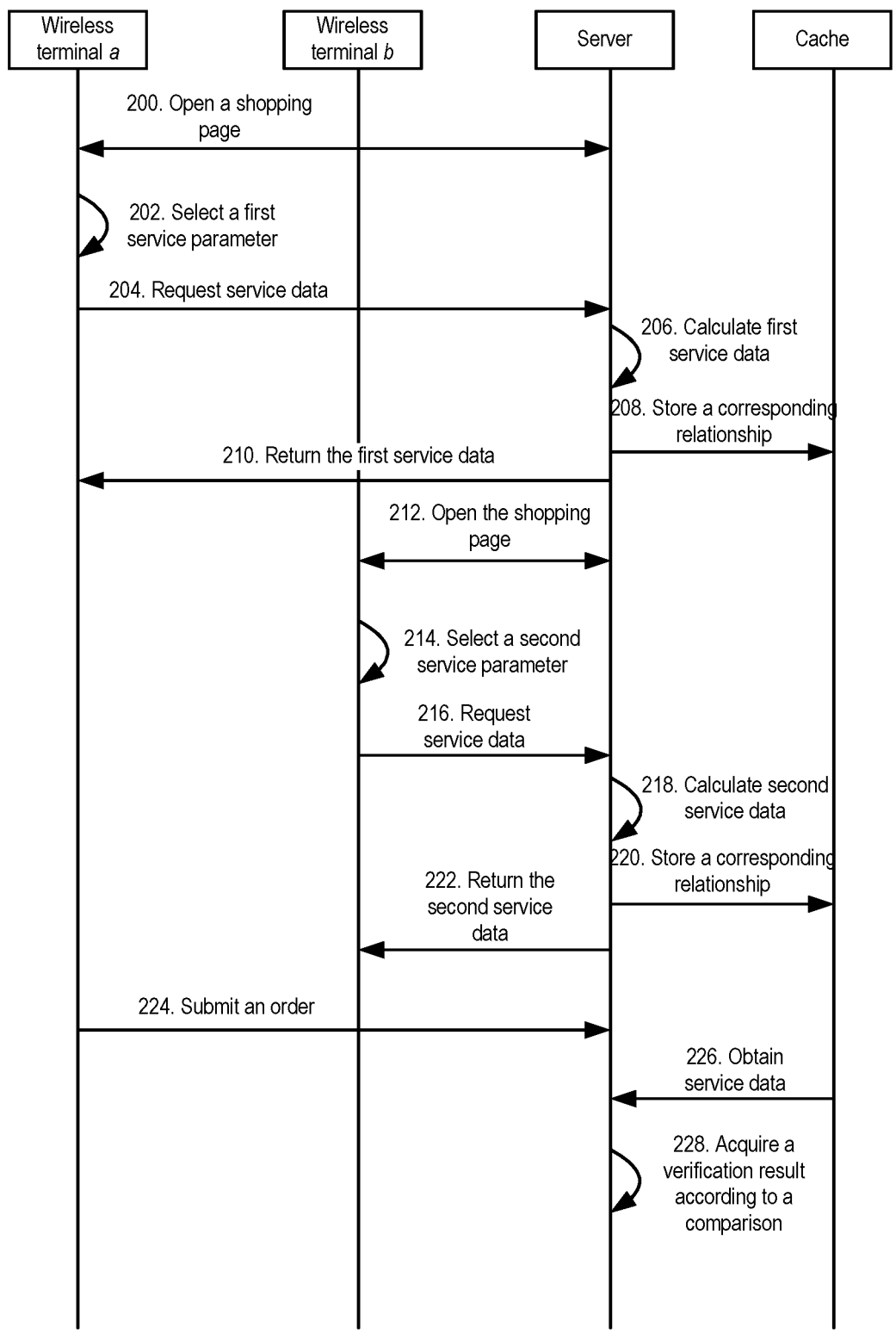
FIG. 2 is an interaction diagram of the service-verification method provided by the one or more embodiments of the present disclosure.

A case where a user creates a shopping order on a wireless terminal is taken as an example below to describe the service-verification method provided in one or more embodiments of the present disclosure. Referencing the interaction diagram shown in FIG. 2, the method may include:

In operation 200, user A opens a shopping page on the wireless terminal a.

For example, user A can request to open the shopping page for shopping on his wireless terminal a, in a manner of entering the address of the shopping page in a browser or clicking a link to the address of the shopping page. Wireless terminal a can request page data from the backend server corresponding to the shopping page, perform page rendering according to the data returned by the server, and display the shopping page to user A.

Wireless terminal a in this example can be referred to as a first terminal. The term "first" is merely used for distinguishing the names of different terminals that appear subsequently, and does not have a limiting effect. Subsequently appeared terms "first," "second," etc. have the same principle. In addition, user A can also log in his account L on wireless terminal a.

In operation 202, user A selects service parameters on the shopping page via the wireless terminal a.

For example, the user selects the service parameters, including: param_1, param_2, . . . , and param_N. These parameters can be referred to as first service parameters.

In operation 204, wireless terminal a requests service data corresponding to the service parameters from the backend server.

For example, wireless terminal a can request to obtain the corresponding service data via a backend interface according to the first service parameters selected by the user. Specifically, wireless terminal a sends a service-data request to the backend server, which may carry the first service parameters and a user account L.

In operation 206, the server calculates service data according to the service parameters.

In this operation, the backend server can calculate, according to the first service parameters "param_1, param_2, . . . , param_N" to obtain the corresponding service data result_1, and service data result_1 can be referred to as a first service data.

In operation 208, the server stores a corresponding relationship between the service data and the service parameters in a distributed cache.

For example, storage can be performed using a Key-Value manner and calculation is performed in the following manner:

Calculation of a Key: all the parameters in the first service parameters are added and hashed to obtain a hash value, wherein the hash value can be used as a Key. For example, assuming that the first service parameters can include "param_1, param_2, . . . , param_N," hash (param_1+param_2 . . . +param_N) can be used as a key. When each parameter (e.g., param_1) is a character string, the aforementioned Key can be obtained by adding these parameter character strings into a large character string and then performing hashing for the large character string.

Calculation of Value: the Value represents the service data. The manner in which the service data is calculated according to the service parameters can be determined according to specific service needs and characteristics. In this example, result_1 in operation 206 can be used as a Value.

The server can store a corresponding relationship between the hash value and the service data. For example, the corresponding relationship can be stored in the distributed cache in the form of Key-Value. In addition, a corresponding relationship between the first service parameters and the first service data can be stored in a storage space corresponding to the user account L.

In operation 210, the server returns the calculated service data to wireless terminal a.

In this operation, the server can send result_1 to the wireless terminal a for confirmation by user A.

Assuming that a relative or friend of user A uses account L of user A to create a shopping order on an another wireless terminal b, then the following operations can be executed:

In operation 212, user B opens the shopping page on wireless terminal b.

Wireless terminal b can be referred to as a second terminal.

In operation 214, user B selects service parameters in the shopping page via wireless terminal b.

For example, the user selects the service parameters including "param_11, param_21, . . . , and param_NN." These parameters can be referred to as second service parameters.

In operation 216, wireless terminal b requests service data corresponding to the service parameter from the backend server.

For example, wireless terminal b can request to obtain the corresponding service data via a backend interface according to the second service parameters selected by the user. Specifically, wireless terminal b sends a service data request to the backend server, which may carry the second service parameters and user account L. The same user account L is used on wireless terminal b and wireless terminal a.

In operation 218, the server calculates the service data according to service parameters.

In this operation, the backend server can calculate and acquire the corresponding service data result_2 according to the second service parameters "param_11, param_21, . . . , and param_NN," and service data result_2 can be referred to as second service data.

In operation 220, the server stores a corresponding relationship between the second service data and the second service parameters in the distributed cache.

In this operation, the manner for the calculation of Key-Value is the same as that in operation 208 and is not described herein in detail.

The server also stores the corresponding relationship between the second service data and the second service parameters in the storage space corresponding to user account L. As described above, when storing a corresponding relationships, regardless of whether the storage space stores other corresponding relationships, the server does not perform data overwriting, but stores a plurality of corresponding relationships in the space. For example, the storage space corresponding to user account L stores at least two corresponding relationships as shown in Table 1 below. Table 1 shows that user account L is logged in on the two terminals, both having configured parameters:

TABLE 1

Corresponding relationships

| Key | Value |
|---|---|
| hash (param_1 + param_2 . . . + param_N) | result_1 |
| hash(param_11 + param_21 . . . + param_NN) | result_2 |

In operation 222, the server returns the calculated service data to wireless terminal b. For example, the server can send result_2 to the wireless terminal b.

Although both user A and user B use account L to configure parameters on their respective terminals, in this example, in the end it is user A who submits an order on wireless terminal a for confirmation.

In operation 224, user A submits the order on wireless terminal a.

For example, on wireless terminal a, user A confirms page information that he filled out and confirms result_1. Considering that an order can be created, user A can click order-creation on the page on wireless terminal a to request the server to create the order, which can be referred to as sending a service-processing request to the server. It should be noted that, at this time when the service-processing request is submitted to the server, the parameters carried are still result_1, as well as the first service parameters "param_1, param_2, . . . , and param_N" configured by user A. The first service parameters can be referred to as the target service parameters, and result_1 can be referred to as the target service data.

In operation 226, the server obtains the service data corresponding to the target service parameters according to the corresponding relationship.

For example, the server can perform a hashing operation on "param_1, param_2, . . . , and param_N," thus obtaining Key=hash (param_1+param_2 . . . +param_N). In addition, the service data result_1 corresponding to the service-processing request can be acquired from the storage space of user account L in the distributed cache, according to the corresponding relationship in Table 1.

In operation 228, the server acquires a verification result according to the comparison outcome between the service data and the target service data.

For example, if the service data obtained in operation 226 is the same as the target service data, then the verification is determined as successful, and the service corresponding to the service-processing request is executed using the target service data. For example, an order can be created using result_1, and target service data result_1 can be saved to the database.

If the obtained service data is different from the target service data, then the verification is determined as failed, and the service-processing request is rejected, that is, the order is not created for the user. In this case, the verification failure may result from the user intentionally tampering with the data. For example, instead of choosing to configure the service parameters on the shopping page, the user modifies the parameters while the wireless terminal is transmitting the parameters to the server. In this case, the user is not allowed to perform subsequent operations, and an exception can be displayed.

In addition, another possibility is that: when the service parameters are tampered with during the transmission from the wireless terminal to the server, it is possible that the tampered service parameters do not exist in the corresponding relationships stored in the distributed cache, then the server can perform a recalculation according to the service parameters (that is, the service parameters after tampering, which can also be referred to as the target service parameters, and the service parameters carried in the service-processing request can be referred to as the target service parameters) transmitted by the wireless terminal, and the acquired service data can be referred to as new service data. The new service data can be compared with the target service data (the service data carried in the service-processing request can be referred to as the target service data) to determine whether the two pieces of data are the same. If the two pieces of data are the same, then the verification succeeds; otherwise, it can be determined that the verification fails.

By storing the service parameters sent by each terminal of the same account and the corresponding calculated service data in the cache, the service-verification method of this example can ensure that verification logic of individual terminals does not interfere with each other. Regardless of the wireless terminal on which the user submits the data, a system can extract the corresponding service data from the cache according to the parameters transmitted by the terminal and compare it with the submitted service data to determine whether the verification succeeds. According to this method, when performing calculation involving dynamic data, if different users use the same account to perform an operation of obtaining dynamic data on different wireless terminals, regardless of which user is performs the operation and on which wireless terminal the operation is performed, it can be ensured that the data submitted by the user is not tampered with and a service is carried out normally without interruption, thereby ensuring a better service flow.

Figure 3:
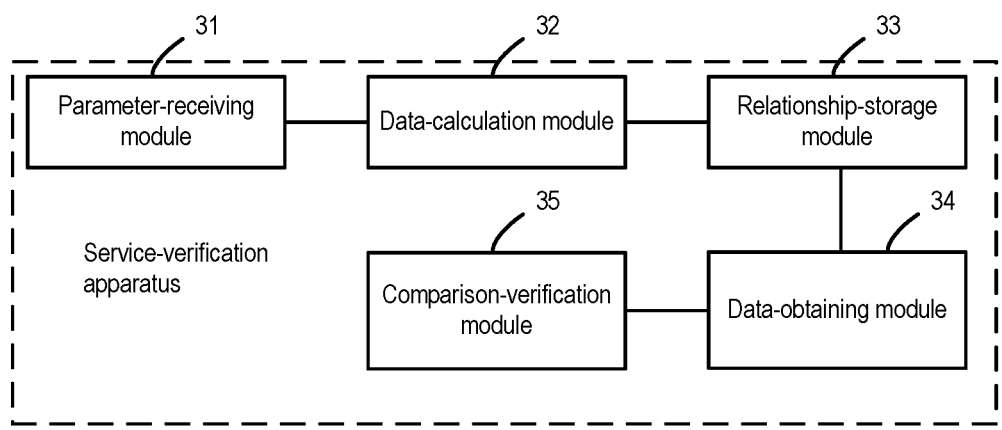
FIG. 3 is a structural schematic diagram of a service-verification apparatus provided by the one or more embodiments of the present disclosure.

In order to implement the above service-verification method, one or more embodiments of the present disclosure further provide a service-verification apparatus. As shown in FIG. 3, the apparatus may include: a parameter-receiving module 31, a data-calculation module 32, a relationship-storage module 33, a data-obtaining module 34, and a comparison-verification module 35.

Parameter-receiving module 31 is configured to respectively receive service parameters sent by the same user account on different terminals. Service parameters sent by the different terminals are different.

Data-calculation module 32 is configured to respectively calculate corresponding service data according to the service parameters sent by each terminal.

Relationship-storage module 33 is configured to store multiple corresponding relationships, each corresponding relationship including: the service parameters sent by one terminal and the corresponding calculated service data.

Data-obtaining module 34 is configured to: when a service-processing request sent by any one of the different terminals is received and the service-processing request carries a target service parameter and target service data used in a current service, obtaining service data corresponding to the target service parameters according to the corresponding relationship.

Comparison-verification module 35 is configured to acquire a verification result according to a comparison outcome between the obtained service data and the target service data.

In one example, relationship-storage module 33 is specifically configured to: when one terminal sends multiple service parameters, perform hashing for the sum of the multiple service parameters to acquire a hash value; and store a corresponding relationship between the hash value and the service data.

In one example, comparison-verification module 35 is specifically configured to:
if the obtained service data is the same as the target service data, then determine that verification succeeds, execute the service corresponding to the service-processing request using the target service data, and store the target service data in a database; and
if the obtained service data is different from the target service data, then determine that the verification fails, and reject the service-processing request.

For ease of description, in the description of the above apparatus, the apparatus is divided into various modules described separately according to functions. Certainly, during implementation of the one or more embodiments of the present disclosure, the functions of the various modules can be implemented in the same or multiple pieces of software and/or hardware.

The execution sequence of the operations shown in the above method embodiments is not limited to the sequence in the flowchart. In addition, the description of each operation can be implemented in the form of software, hardware, or a combination thereof. For example, those skilled in the art can implement it in the form of software codes, which can be computer-executable instructions capable of implementing the logical functions corresponding to the operation. When the operation is implemented in the form of software, the executable instructions may be stored in a memory and executed by a processor in a device.

For example, corresponding to the above method, one or more embodiments of the present disclosure provide a service-verification device, and the device can include: a processor, a memory, and computer instructions stored in the memory and executable by the processor, when executing the instructions, the processor implementing the following operations:
respectively receiving service parameters sent by the same user account on different terminals, the service parameters sent by the different terminals being different;
respectively calculating corresponding service data according to the service parameters sent by each terminal;
storing a plurality of corresponding relationships, each corresponding relationship comprising: the service parameters sent by one terminal and the corresponding calculated service data;
when a service-processing request sent by any one of the different terminals is received and the service-processing request carries a target service parameter and target service data used in a current service, obtaining service data corresponding to the target service parameter according to the corresponding relationship; and
acquiring a verification result according to a comparison outcome between the obtained service data and the target service data.

The apparatus or module illustrated in the above embodiments may be specifically implemented by a computer chip or entity, or by a product with certain functionalities. A typical implementation device is a computer, the specific form of a computer may be a personal computer, a laptop computer, a cellular telephone, a camera phone, a smartphone, a personal digital assistant, a media player, a navigation device, an email transceiver device, a gaming console, a tablet computer, a wearable device, or a combination of any of these devices.

Those skilled in the art will appreciate that one or more embodiments of the present disclosure may be provided as a method, system, or computer program product. Accordingly, one or more embodiments of the present disclosure may take the form of a full hardware embodiment, a full software embodiment, or a combination of software and hardware. Further, one or more embodiments of the present disclosure can be in the form of computer program products that may be implemented on one or more computer readable storage mediums (including, but not limited to, disk storage, CD ROM, optical storage, etc.) that include computer readable program codes.

These computer program instructions may also be stored in a computer readable memory capable of directing a computer or other programmable data processing device in a particular manner, such that instructions stored in the computer-readable memory produce a manufacturing product that includes an instruction device that implements the functions specified in one or more processes in a flowchart and/or one or more blocks in a block diagram.

These computer program instructions may also be loaded onto a computer or other programmable data processing devices such that a series of operations are performed on the computer or other programmable device to produce computer-implemented processing, such that instructions executed on the computer or other programmable devices provide operations for implementing the functions specified in one or more processes in a flowchart and/or one or more blocks in a block diagram.

It is also important to note that the terms "including", "comprising" or any other variant thereof are intended to cover non-exclusive inclusion, such that processes, methods, goods or devices, including a series of elements, include not only those elements but also other elements not explicitly listed, or also include elements inherent to such processes, methods, goods or equipment. In the absence of more restrictions, the element defined by the statement "including one . . . " does not exclude other identical elements in the process, method, commodity or equipment that includes the element.

One or more embodiments of the present disclosure may be described in the general context of computer-executable instructions executed by a computer, such as a program module. Typically, program modules include routines, programs, objects, components, data structures, and the like that perform specific tasks or implement specific abstract data types. One or more embodiments of the present disclosure can also be practiced in a distributed computing environment in which the task is performed by a remote processing device connected by a communication network. In a distributed computing environment, program modules can be located in local and remote computer storage media, including storage devices.

Each embodiment of the present disclosure is described in a progressive manner, and the same or similar sections between various embodiments are described with reference to each other, each of which is focused on the differences with other embodiments. In particular, for a service-end device embodiment, as it is substantially similar to the method embodiment, the description is simple and relevant, and for the relevant part, reference is made to the part of description of the method embodiment.

The foregoing describes specific embodiments of the present disclosure. Other embodiments fall within the scope of the appended claims. In some cases, the actions or operations recited in the claims may be performed in a sequence different from the order in the embodiments and may still achieve the desired result. Further, the processes depicted in the drawings do not necessarily require the particular order or sequential order shown to achieve the desired result. In certain implementations, multitasking and parallel processing is or may be advantageous.

Only some embodiments of the one or more embodiments of the present disclosure are described above, and they are not intended to limit the present disclosure, any modifications, equivalent substitutions, improvements, etc. made within the spirit and principles of the present disclosure, shall fall within the protection scope of the present disclosure.

What is claimed is:

1. A service-verification method, the method comprising:
respectively receiving service parameters sent by a same user account on different terminals, the service parameters sent by the different terminals being different;
respectively calculating corresponding service data according to the service parameters sent by each of the different terminals;
storing a plurality of corresponding relationships, each of the plurality of corresponding relationships comprising: the service parameter sent by one of the different terminals and the corresponding calculated service data;
when a service-processing request sent by any one of the different terminals is received and the service processing-request carries a target service parameter and target service data used in a current service, obtaining the calculated service data corresponding to the target service parameter according to the corresponding relationship; and
acquiring a verification result according to a comparison between the obtained calculated service data and the target service data,
wherein in response to one terminal of the different terminals sends a plurality of service parameters, the storing the plurality of corresponding relationships includes:
performing hashing for a sum of the plurality of service parameters to acquire a hash value; and
storing a corresponding relationship between the hash value and the service data.

2. The method according to claim 1, wherein the plurality of corresponding relationships are stored in a distributed cache.

3. The method according to claim 1, wherein acquiring the verification result according to the comparison between the obtained service data and the target service data comprises:
if the obtained service data is the same as the target service data, then determining that the verification succeeds, executing a service corresponding to the service-processing request using the target service data, and saving the target service data to a database; and
if the obtained service data is different from the target service data, then determining that the verification fails, and rejecting the service-processing request.

4. The method according to claim 1, wherein the method further comprises:
if the target service parameter does not exist in the corresponding relationships, then calculating the corresponding service data according to the target service parameter; and
determining whether the service data corresponding to the target service parameter is the same as the target service data, and if they are the same, then the verification succeeds; otherwise, the verification fails.

5. The method according to claim 1, wherein respectively receiving the service parameters sent by the same user account on the different terminals, respectively calculating the corresponding service data according to the service parameters sent by the each of the different terminals, and storing the plurality of corresponding relationships comprise:
receiving a first service parameter sent by a first terminal, and calculating corresponding first service data according to the first service parameter, the first terminal corresponding to the same user account;

storing a corresponding relationship between the first service parameter and the first service data in a storage space corresponding to the same user account;

receiving a second service parameter sent by a second terminal, and calculating corresponding second service data according to the second service parameter; storing a corresponding relationship between the second service parameter and the second service data in the storage space; and wherein obtaining the service data corresponding to the target service parameter comprises: obtaining the service data corresponding to the target service parameter from the storage space of the same user account corresponding to the service-processing request.

6. A service-verification apparatus, the apparatus comprising:

a parameter-receiving module configured to respectively receive service parameters sent by a same user account on different terminals, the service parameters sent by the different terminals being different;

a data-calculation module configured to respectively calculate corresponding service data according to the service parameter sent by each of the different terminals;

a relationship-storage module configured to store a plurality of corresponding relationships, each of the plurality of corresponding relationships comprising: the service parameters sent by one of the different terminals and corresponding calculated service data;

a data-obtaining module configured to: when a service-processing request sent by any one of the different terminals is received and the service-processing request carries a target service parameter and target service data used in a current service, obtaining the calculated service data corresponding to the target service parameter according to the corresponding relationships; and a comparison verification module configured to acquire a verification result according to a comparison between the obtained calculated service data and the target service data, wherein in response to one terminal of the different terminals sends a plurality of service parameters, the storing the plurality of corresponding relationships includes:

performing hashing for a sum of the plurality of service parameters to acquire a hash value; and storing a corresponding relationship between the hash value and the service data.

7. The apparatus according to claim 6, wherein the comparison-verification module is specifically configured to:

if the obtained service data is same as the target service data, then determine that the verification succeeds, execute a service corresponding to the service-processing request using the target service data, and saving the target service data to a database; and if the obtained service data is different from the target service data, then determine that the verification fails, and reject the service-processing request.

8. A service-verification device, the device comprising: a memory, a processor, and computer instructions stored on the memory and executable on the processor, when executing the instructions, the processor implementing following operations:

respectively receiving the service parameters sent by a same user account on different terminals, the service parameters sent by the different terminals being different;

respectively calculating corresponding service data according to service parameters sent by each of the different terminals;

storing a plurality of corresponding relationships, each of the plurality of corresponding relationships comprising: the service parameters sent by one of the different terminals and corresponding calculated service data;

when a service-processing request sent by any one of the different terminals is received and the service-processing request carries a target service parameter and target service data used in a current service, obtaining the calculated service data corresponding to the target service parameter according to the corresponding relationships; and acquiring a verification result according to a comparison between the obtained calculated service data and the target service data, wherein in response to one terminal of the different terminals sends a plurality of service parameters, the storing the plurality of corresponding relationships includes:

performing hashing for a sum of the plurality of service parameters to acquire a hash value; and storing a corresponding relationship between the hash value and the service data.

9. The service-verification device according to claim 8, wherein the plurality of corresponding relationships are stored in a distributed cache.

10. The service-verification device according to claim 8, wherein acquiring the verification result according to the comparison between the obtained service data and the target service data comprises:

if the obtained service data is the same as the target service data, then determining that the verification succeeds, executing a service corresponding to the service-processing request using the target service data, and saving the target service data to a database; and if the obtained service data is different from the target service data, then determining that the verification fails, and rejecting the service-processing request.

11. The service-verification device according to claim 8, wherein the operations further comprise:

if the target service parameter does not exist in the corresponding relationships, then calculating the corresponding service data according to the target service parameter; and determining whether the service data corresponding to the target service parameter is the same as the target service data, and if they are the same, then the verification succeeds; otherwise, the verification fails.

12. The service-verification device according to claim 8, wherein respectively receiving the service parameters sent by the same user account on the different terminals, respectively calculating the corresponding service data according to the service parameters sent by the each of the different terminal, and storing the plurality of corresponding relationships comprise:

receiving a first service parameter sent by a first terminal, and calculating corresponding first service data according to the first service parameter, the first terminal corresponding to the same user account;

storing a corresponding relationship between the first service parameter and the first service data in a storage space corresponding to the same user account;

receiving a second service parameter sent by a second terminal, and calculating corresponding second service data according to the second service parameter; storing a corresponding relationship between the second service parameter and the second service data in the storage space; and wherein obtaining the service data corresponding to the target service parameter comprises: obtaining the service data corresponding to the target service parameter from the storage space of the same user account corresponding to the service-processing request.

13. The apparatus according to claim 6, wherein the relationship-storage module is configured to store the plurality of corresponding relationships in a distributed cache.

14. The apparatus according to claim 6, wherein, in response to the data-obtaining module determines that the target service parameter does not exist in the corresponding relationships, the data-calculation module is configured to calculate the corresponding service data according to the target service parameter; and wherein the comparison verification module is configured to determine whether the service data corresponding to the target service parameter is the same as the target service data, and if the service data corresponding to the target service parameter is the same as the target service data, the comparison verification module determines that the verification succeeds; otherwise, the comparison verification module determines that the verification fails.

15. The apparatus according to claim 6, wherein, while respectively receiving the service parameters sent by the same user account on the different terminals, respectively calculating the corresponding service data according to the service parameters sent by the each of the different terminals, and storing the plurality of corresponding relationships, the parameter-receiving module, the data-calculation module, and the relationship-storage module are configured to:

receive a first service parameter sent by a first terminal, calculate corresponding first service data according to the first service parameter, the first terminal corresponding to the same user account, and store a corresponding relationship between the first service parameter and the first service data in a storage space corresponding to the same user account; and receive a second service parameter sent by a second terminal, calculate corresponding second service data according to the second service parameter, and store a corresponding relationship between the second service parameter and the second service data in the storage space; and wherein, while obtaining the service data corresponding to the target service parameter, the data-obtaining module is configured to obtain the service data corresponding to the target service parameter from the storage space of the same user account corresponding to the service-processing request.

* * * * *